Dec. 11, 1962 K. D. BROADBENT 3,068,453

THIN FILM MAGNETIC DEVICE

Filed Nov. 2, 1959 4 Sheets-Sheet 1

Kent D. Broadbent,
INVENTOR.

BY

Ernest L. Oberheim

AGENT.

Kent D. Broadbent
INVENTOR.
BY.

Earnest F. Oberlin

AGENT.

THIN FILM MAGNETIC DEVICE

Filed Nov. 2, 1959 4 Sheets-Sheet 3

Kent D. Broadbent,
INVENTOR.
BY.
Ernest F. Oberlin
AGENT.

Dec. 11, 1962 K. D. BROADBENT 3,068,453
THIN FILM MAGNETIC DEVICE
Filed Nov. 2, 1959 4 Sheets-Sheet 4
| Time | Flip Flop 70 | Flip Flop 80 | "And" Gate |
|---|---|---|---|
| 1 | 0 | 0 | 92 |
| 2 | 1 | 0 | 88 |
| 3 | 0 | 1 | 90 |
| 4 | 1 | 1 | 86 |
Fig. 11.
Fig. 7.
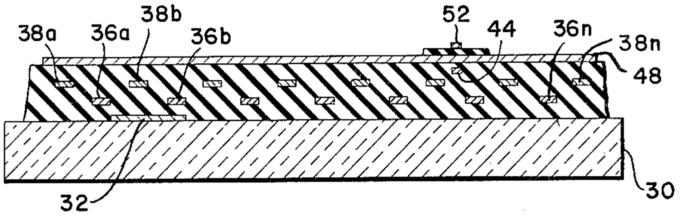
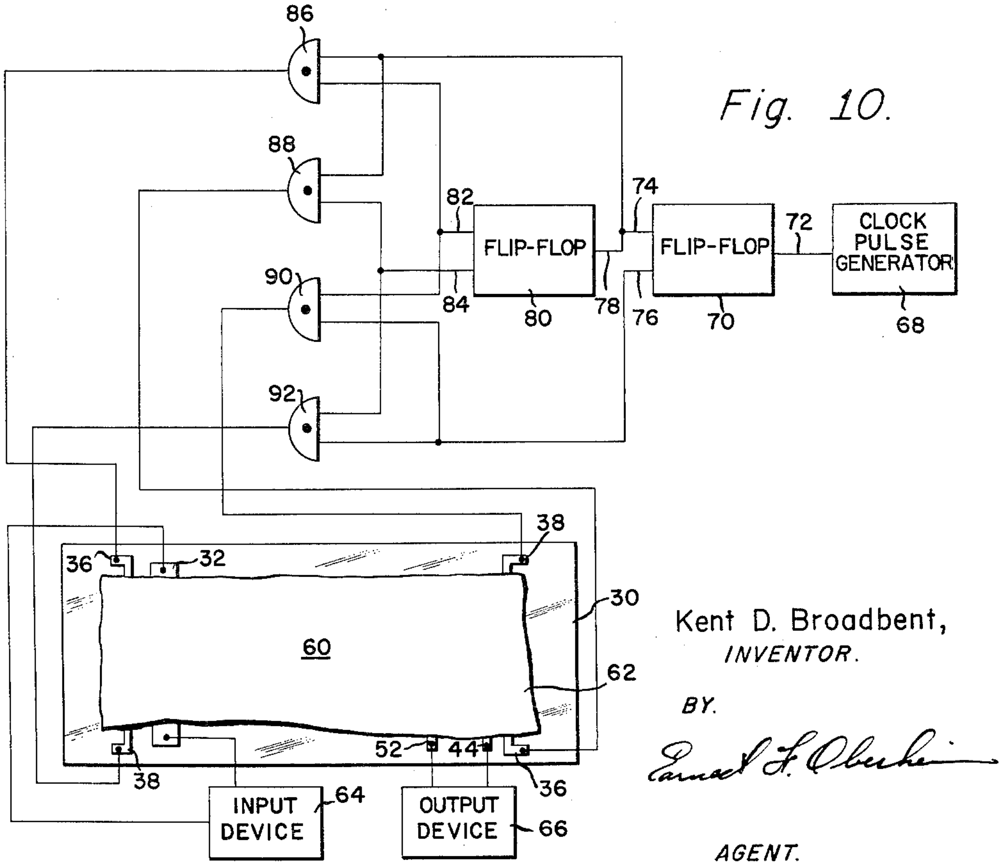
Fig. 10.
Kent D. Broadbent,
INVENTOR.
BY.
Earnest F. Oberheim
AGENT.

United States Patent Office 3,068,453

Patented Dec. 11, 1962

3,068,453

THIN FILM MAGNETIC DEVICE

Kent D. Broadbent, San Pedro, Calif., assignor to Hughes Aircraft Company, Culver City, Calif., a corporation of Delaware Filed Nov. 2, 1959, Ser. No. 850,436
12 Claims. (Cl. 340—174)

This invention relates to magnetic devices and more particularly to magnetic elements comprising a plurality of thin film layers for shifting information from one area to another.

It has long been recognized that effective miniaturization could be achieved if electronic components could be formed by vacuum deposition manufacturing techniques. In complex devices such as digital computers, for example, such structures would be extremely useful since this method of manufacture would enable large numbers of components and circuits to be deposited simultaneously. Additionally, it should be expected that reduction in size of the components will reduce operating power requirements.

The storing and propagation of binary information is a basic problem in the electronic art, particularly in the design of digital computers and many other devices. A fundamental component for storing and propagating information is a shift register. Shift registers have been designed using vacuum tubes, transistors, magnetic cores and other devices. However, such devices are subject to many disadvantages. As examples of such disadvantages, prior art shift registers are relatively large in size, require relatively large amounts of power for operation, are not well suited to mass production techniques, and in many cases are not well adapted to extremely fast operation.

It is, accordingly, an object of this invention to provide a novel magnetic device having faster operation than conventional magnetic devices.

Another object of this invention is to provide a novel magnetic device requiring relatively little power for operation.

Still another object of this invention is to provide a magnetic device constructed of thin films and adapted to mass production techniques such as vacuum deposition.

A further object of this invention is to provide a novel magnetic device of extremely small size.

This invention provides means for storing and propagating binary information in a suitable magnetic material and can be adapted to provide a shift register or a time delay element not subject to the disadvantages mentioned above. When used as a shift register, the device is similar to conventional shift registers only in the sense that it performs a similar function; however, it differs therefrom in both structural organization and in principle of operation. It comprises a magnetic film and a plurality of associated conducting and insulating layers associated therewith such that a magnetized area or domain on the film can be propagated at will along the film.

Further and additional objects and advantages will become apparent hereinafter during the detailed description of an embodiment of the invention illustrated by way of example in the accompanying drawings in which.

Figure 3:
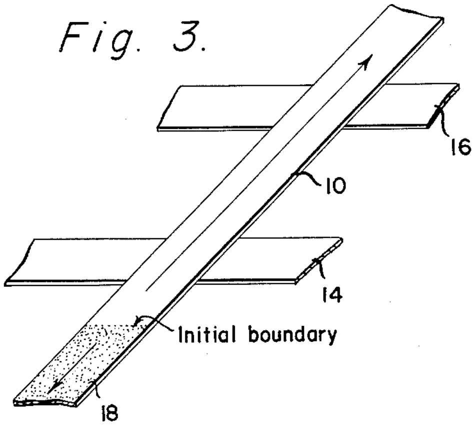
Figure 4:
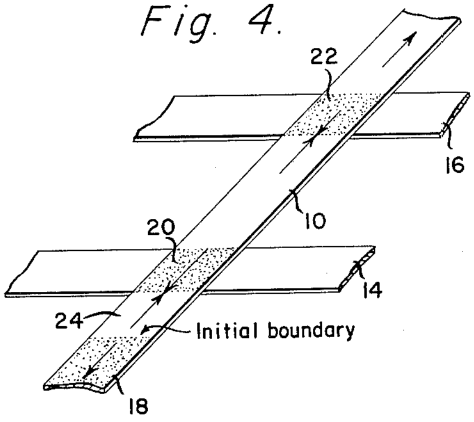
Figure 5:
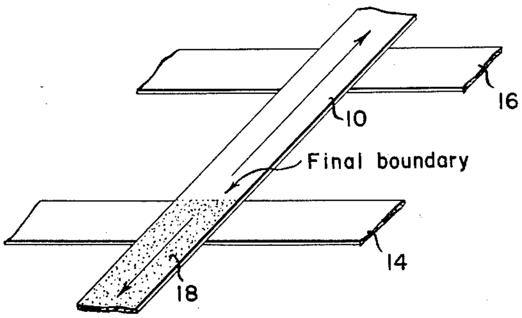
Figures 6, 8:
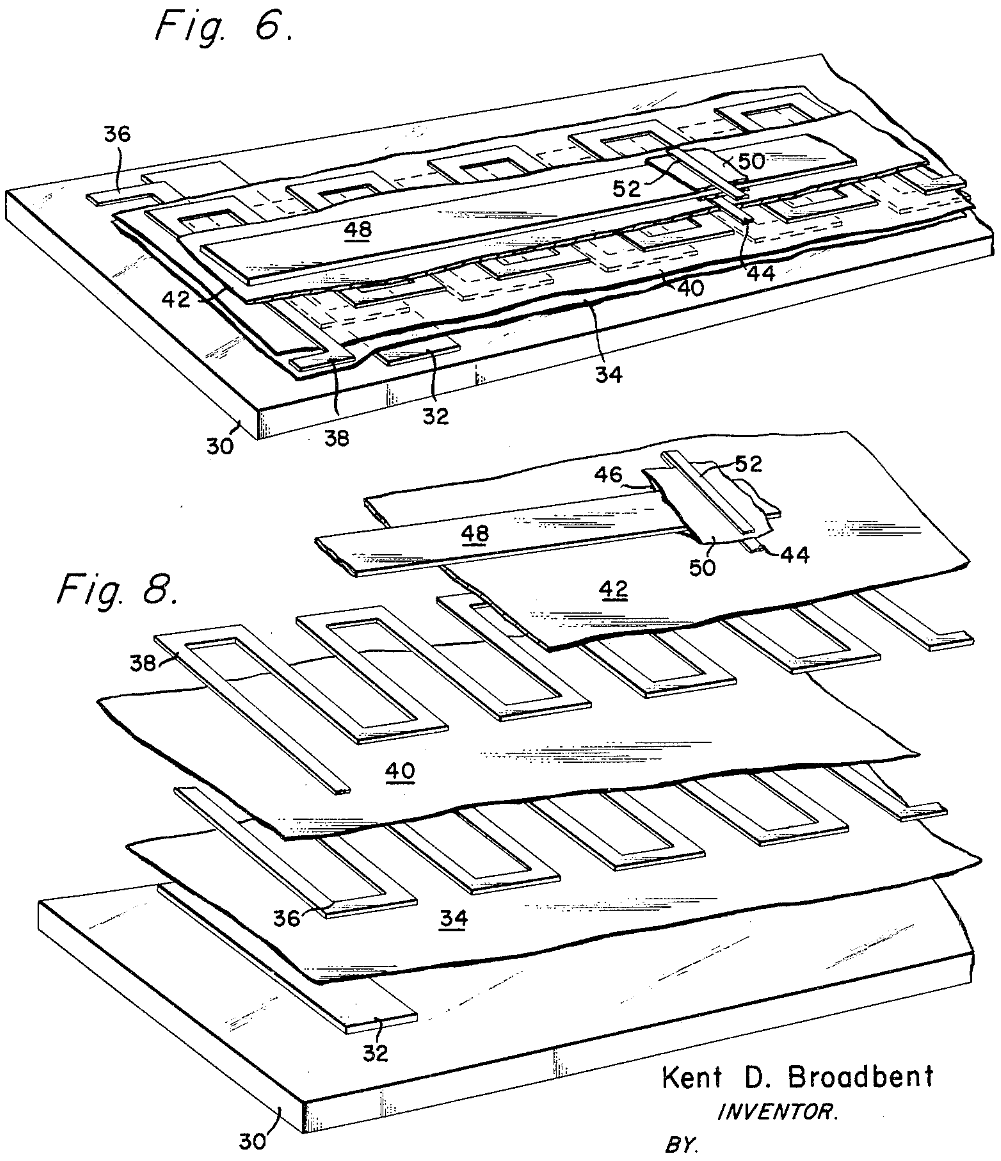

FIGS. 3, 4, and 5 each show a thin film magnetic material having two superimposed conducting sheets and depicting various stages of the operation of the device;

FIG. 6 is a distorted perspective view of a shift register constructed in accordance with the principles of this invention;

FIG. 7 is an idealized, enlarged vertical sectional view of the device shown in FIG. 6;

FIG. 8 is an exploded and enlarged view of the thin film layers comprising the magnetic device of FIG. 6 and indicating a sequential order of deposition;

FIGS. 9*a*–9*j* are idealized, enlarged vertical sectional views of the magnetic device of FIGS. 6–8 showing the operation of the device;

FIG. 10 is a circuit diagram showing the device of FIGS. 6–8 in an operative circuit; and FIG. 11 is a table showing the energization of various portions of the circuit of FIG. 10.

In all of the descriptions of the operation of the magnetic devices which follow, it is to be understood that, while the explanations given appear to be reasonably and qualitatively correct, the description of magnetization phenomena is highly simplified for the purpose of clarity in explanation. In actuality, magnetic domain formation and interaction is known to be extremely complex and the simple explanations offered herein may not fully describe the theory of operation of this invention. It should be further understood that the theory of operation herein offered is merely supplied for explanatory purposes and that the utility of the invention does not depend upon the accuracy of the principles of operation suggested.

Figure 1:
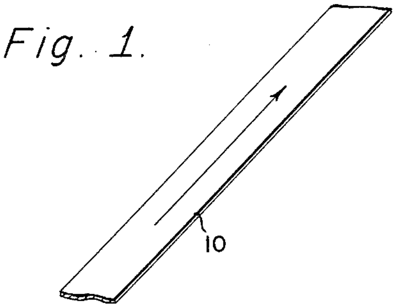
FIG. 1 shows a single thin film strip of magnetic material.
Figure 2:
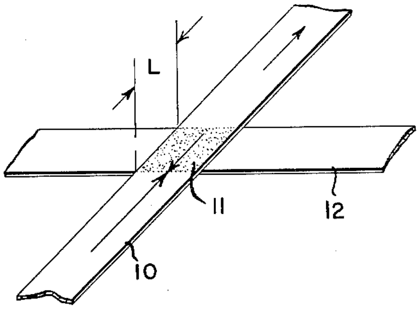
FIG. 2 shows the single thin film strip of magnetic material and a conducting strip superimposed.

Turning now to FIGS. 1 and 2, there is shown a thin film strip 10 of magnetic material in which a single magnetic domain has been established running along the length of this material. Since an electromagnetic field surrounding a conductor is produced by the passage of current through the conductor, an antiparallel domain 11 of length L may be created within this strip 10 by passing an electric current through an appropriately positioned sheet conductor 12, as shown in FIGURE 2. The direction of magnetization of the strip 10 may be controlled by controlling the direction of current flow through the conductor 12.

It is well-known that any material which has been magnetized is subject to a self-demagnetizing force. Since th magnetostatic energy is, in a general sense, inversely proportional to the length of the magnetic domain L, the greater the length L the lower the magnetostatic energy, assuming width and thickness remain constant. If the length of the magnetic domain is reduced, a condition will be attained in which the magnetostatic energy of the domain becomes so high that the domain will become unstable and will no longer retain magnetization properties which provide single magnetic domain terminal states. Thus, subject to the antiparallel domain's self-demagnetizing tendencies and also subject to the biasing action of the adjacent material, the antiparallel domain 11 may or may not be stable within its environment. Assuming width and thickness constant, if L is sufficiently large, a stable magnetic domain will result when current is passed through the conducting sheet 12, which domain will remain upon removal of the excitation current from the conducting sheet 12. As L is decreased, a length will be reached where a stable domain configuration no longer obtains. The critical length where this transition occurs will be called the "snapback" length. Below the snapback length the created domain will vanish because of the bias of the adjacent material and the self-demagnetizing effect discussed above, when current is removed from the conducting sheet 12. The snapback length is dependent upon the dimensions involved and the magnetic material chosen.

As an example, if the thickness of the magnetic sheet is 8,000 A. (Angstroms) the coercive force is 1 oersted and the remanent B value is 7000 gauss the snapback length for this typical magnetic material will be approximately 0.2 inch.

It can be seen from the above that there exists the possibility of adjusting the length of a created domain to make the domain stable or unstable as desired. This possibility permits the use of the snapback effect to effectively translate or shift existing domain boundaries.

The translation of a domain boundary is shown in FIGS. 3, 4 and 5. In FIG. 3, a magnetic sheet 10 is superimposed over two conducting sheets 14 and 16. Assuming that an antiparallel magnetic domain has previously been created in the section 18 of the magnetic sheet 10, as shown, electric current will now be passed through both conducting sheets 14 and 16 in such a direction as to cause antiparallel magnetization of those portions 20 and 22 of the magnetic sheet 10 immediately adjacent the conducting sheets 14 and 16. If the length of the antiparallel domains, shown as 20 and 22 in FIGURE 4, is less than the snapback length and if the distance 24 between the boundary of the stable domain 18 and the domain 20 is less than the snapback length, upon removal of the exciting currents, the configuration shown in FIGURE 5 will result. The antiparallel domain 22 will disappear because of the bias of the adjacent material and the self-demagnetizing effect discussed above when current is removed from the conducting sheet 16. However, the stable domain 18 will be extended to include the antiparallel domain 20. This translation or shift of the boundary of the stable domain 18 results since the portion 24 of sub-snapback length will reverse some time during the interval that current was applied to conducting sheet 14. It can be seen that, if the portion 24 is reversed, the stable domain boundary is effectively extended to include both the portions 24 and 20.

Investigations have been conducted into the magnetic behaviour of ferromagnetic films deposited on substrates. One such investigation is reported in the Journal of Applied Physics, volume 26, August 1955, and is entitled "Preparation of Thin Magnetic Films and Their Properties" by M. S. Blois, Jr., at pages 975 through 980.

An application of the principles disclosed in FIGURES 1–5 yielding a shift register is shown in FIGURES 6–8. In these figures, various dimensions have been distorted so that the details of the invention can be clearly seen.

The device shown in FIGS. 6–8 may be manufactured by successive applications of the vacuum deposition technique in which each of the respective magnetic, insulative and conductive layers shown in FIGS. 6–8 are superimposed in an appropriate order. The magnetic layer may be composed of permalloy material and have a thickness of approximately 6,000 A. The conductive layers may be composed of aluminum and the insulative layers of silicon monoxide. The thickness of the conductive and insulative layers may be approximately 10,000 A.

The thickness of the magnetic film layer is governed at the lower limit by the disappearance of ferromagnetic properties while the appearance of significant eddy-current losses at the relatively high frequencies used in digital computing devices governs the upper limit of said thickness.

An elemental structure providing the function of a shift register is shown in FIGS. 6–8. Since the entire structure is composed of thin films, a carrier or substrate 30 is required. The choice of a suitable substrate is made according to the considerations referred to in the before-mentioned Blois article. For the purposes of this invention a suitable substrate has been found to be a commercially available soft glass which is an insulative medium as required. However, other insulating materials able to withstand higher temperatures may be used.

Upon the substrate 30 there is deposited a plurality of conducting, insulative, and magnetic layers which will be described in detail below. With respect to the various conducting layers, it should be pointed out that their order is not critical and can be varied without impairment of the functioning of the device.

The first layer to be deposited is an input electrode which is a conducting layer 32, rectangular in shape, which is used to impress a stable antiparallel magnetic domain in the magnetic layer to be described. Since the created magnetic domain must be stable, the width of the conducting layer 32 must be greater than the critical snapback length. Above the conducting layer 32, an insulating layer 34 is deposited. The insulating layer 34 must have a size and shape to prevent electrical contact between the conducting layer 32 and the various conducting and magnetic layers which will be superimposed thereupon. Above the insulating layer 34 is superimposed a pair of propagating electrodes 36 and 38, separated by an insulating layer 40 which is shaped to prevent electrical contact between the propagating electrodes 36 and 38. The propagating electrodes 36 and 38, which are formed of conducting materials, each comprise a plurality of parallel electrode portions 36*a*, 36*b*, . . ., 36*n*, and 38*a*, 38*b*, . . ., 38*n* (see FIG. 7), extending transversely of the magnetic medium to be described, which electrode portions are electrically connected to form a continuous conductor to form a zigzag pattern such that current in adjacent portions flows in opposite directions. Thus, a current applied to electrode 36 will pass through each of electrode portions 36*a*, 36*b*, . . ., 36*n*, and similarly a current applied to electrode 38 will pass through each of the portions 38*a*, 38*b*, . . ., 38*n*. The widths of each of the electrode portions of the electrodes must be less than the critical snapback length. It is further required that the distance between adjacent parallel electrode portions such as 36*a* and 38*a* must also be less than the critical snapback length. Further, referring to FIGURE 8, the read-in electrode, conducting layer 32, must be about four times the width of a propagating electrode, such as 38*a* because of the electrode configuration chosen in the embodiment of this invention shown in FIGS. 6–8. However, other embodiments utilizing the same principles of operation can be made using other electrode configurations.

Above the electrode 38 is deposited an insulating layer 42, which insulating layer must prevent electrical contact between the electrode 38 and superimposed conducting and magnetic layers. Above the insulating layer 42 is deposited a magnetic layer 48, rectangular in shape, which extends across the entire length of the device. Around the magnetic layer 48 is looped an output winding, composed of conducting layers 44 and 52, each rectangular in shape, and deposited such that electrical contact is made between the lower layer 44 and the upper layer 52 at one end of each of these layers. The conducting layers 44 and 52 are prevented from making electrical contact with the magnetic layer 48 and between themselves, except at said one end, by an insulating layer 46 deposited between the conducting layer 44 and the magnetic layer 48, and an insulating layer 50 deposited between magnetic layer 48 and conducting layer 52.

Figure 9:
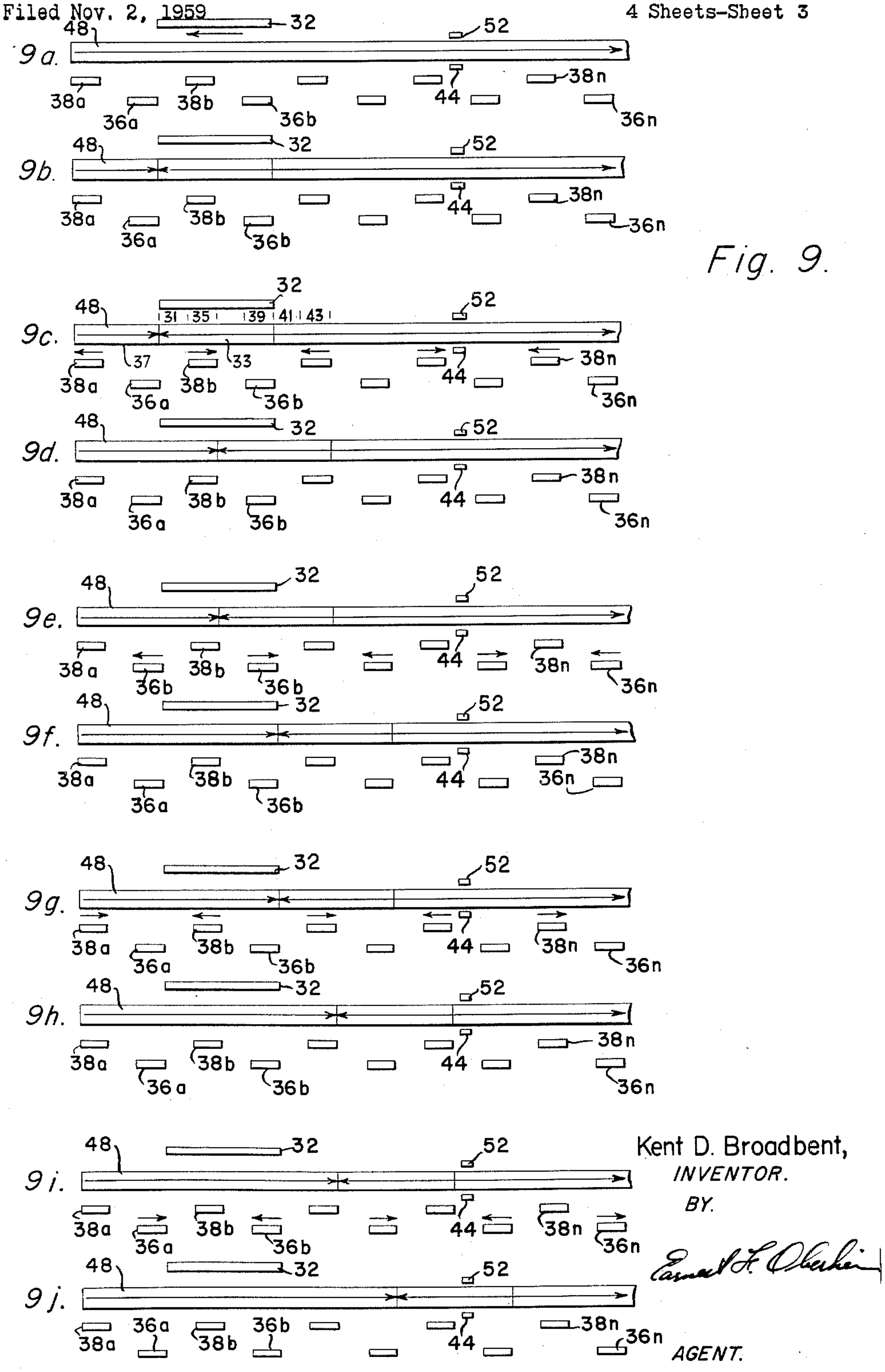

The operation of the shift register shown in FIGS. 6–8 is described below with reference to FIGS. 9*a*–9*j*. FIGS. 9*a*–9*j* are schematic representations of a cross-section taken through the device of FIGS. 6–8 at various times during the operation of the shift register. Note that the conductor 32 is shown above the magnetic layer 48 rather than below the layer. This change is merely for the purpose of explanatory convenience, and to show a satisfactory alternative arrangement. FIG. 9*a* shows the initial condition of the magnetic medium 48, in which the medium is shown magnetized in a first direction as a single domain. Binary information will be represented on the medium according to the arbitrary convention, in which an area of magnetization of the medium 48 in the first direction (shown to the right in FIG. 9) is assumed to represent a binary "zero" and by assuming that an area of magnetization of the medium 48 in an opposite or antiparallel direction represents a binary "one."

If it is desired to record binary information on the medium 48, current is passed through the conductor 32. The passage of current through the conductor 32 causes a magnetic field to appear around the conductor, which field will tend to magnetize the portion of the magnetic sheet 48 adjacent the conductor 32. By controlling the direction of current in the conductor 32, magnetization may be induced in the portion of the magnetic sheet 48 adjacent the conductor 32 in either the first direction or the antiparallel direction. If it is desired to record a binary "one," current must be passed through the conductor 32 in such a direction as to cause a magnetic field to pass through the medium in an antiparallel direction, as shown in FIG. 9*a*. A binary "zero" can be recorded either by passing current through the conductor 32 in the opposite direction or by not supplying current to the conductor 32, since the magnetic sheet 48 has an initial magnetization in the "zero" direction.

Since the portion of the magnetic sheet 48 which is magnetized by the passage of current through the conductor 32 is larger than the critical snapback length, the area of antiparallel magnetization produced will be stable and will remain after the inducing current is removed from the conductor 32. FIG. 9*b* shows the condition of the medium after current has been removed from the conductor 32. It can be seen in FIG. 9*b* that a stable area of antiparallel state of magnetization has been created in the magnetic medium 48.

FIGS. 9*c*–9*j* show the condition of the magnetic medium and the conditions of the electrodes 36 and 38 at various times between the recording of information by the input electrode 32 and the read-out of information by the output electrode made up of conductors 44 and 52. FIG. 9*c* shows the first step in the motion cycle which involves actuating the electrode 38 by passing current through the entire electrode 38. From the shape of the electrode shown and described in connection with FIGS. 6–8, it can be seen that if electrode portion 38*a* is producing a magnetic field of a first direction, then electrode portion 38*b* will be producing a magnetic field of an antiparallel direction and successive electrodes (38*c*, 38*d*, . . ., 38*n*) will produce magnetic fields of alternately opposite directions. This is evident from the fact that the electrode is constructed such that current passes in a first direction in the first electrode portion 38*a* and in an opposite direction in each of the succeeding electrode portions. FIG. 9*c* then shows the actuation of the electrode 38 by the passage of current through the electrode in the first direction.

From considerations given above it can be seen that both boundaries of the antiparallel zone 33 shown in FIG. 9*c* will move from the position shown in FIG. 9*c* to the position shown in FIG. 9*d*.

Referring to FIG. 9*c*, it can be seen that a portion 31 of the stable antiparallel magnetized domain 33 exists between the two parallel magnetized portions 37 and 35, since actuation of the electrode portion 38*b* in the direction shown creates a parallel magnetized portion 35 in the medium 48. Since the portion 31 is of length less than the critical length L, it will reverse, extending the left boundary of the stable antiparallel magnetized zone 33 to the position shown in FIG. 9*d*. Similarly, the parallel magnetized portion 41 exists between the antiparallel magnetized portions 39 and 43 and will also reverse, extending the right boundary of the stable antiparallel magnetized zone 33 to the position shown in FIG. 9*d*. Thus, the stable antiparallel magnetized zone 33 has been effectively moved from the position shown in FIG. 9*c* to the position shown in FIG. 9*d*.

It should be noted that other electrodes, such as the electrode 38*n*, will also create zones which may be reversed in magnetization from the adjacent portions of the magnetic medium 48. However, it can be seen that these zones will disappear when the exciting current is removed, since the created zones are of length less than the critical snapback length L and are between stable zones of opposite magnetization.

During the next step in the motion cycle, the electrode 36 is actuated by passing current through the electrode in the first direction. This passage of current produces opposite magnetization at each of the electrode portions and causes the motion of the stable zone from the position shown in FIG. 9*e* to the position shown in FIG. 9*f*. During the next interval of the motion cycle, the electrode 38 is again actuated but in the opposite direction, producing a movement of the stable antiparallel domain from the position shown in FIG. 9*g* to the position shown in FIG. 9*h*. During the last portion of the motion cycle, the electrode 36 is actuated in the opposite direction, producing a movement of the stable antiparallel zone from the position shown in FIG. 9*i* to the position shown in FIG. 9*j*. During this portion of the motion cycle, it can be seen that the stable antiparallel zone has passed under the output winding composed of conductors 44 and 52. Since a change in magnetization has occurred in an area enclosed by the output winding, an output pulse will appear across the conductors 44 and 52. This output pulse can be used to determine the condition or direction of magnetization of the medium. Thus, a shift register has been described. It can be seen that the output winding can be placed wherever desired to yield any desired time delay and that a shift register of any length may be fabricated. It should be appreciated also that, while the description above only included a single input pulse, in practice a succession of pulses representing binary numbers would, in fact, be used. Thus, some time after a first antiparallel domain has been moved out of the input area, as shown in FIG. 9*h*, a second antiparallel domain may be created in the medium. Thus, a series of domains may be created and propagated. This required time spacing is approximately equal to the width of a stable domain.

FIG. 10 is a circuit diagram of an operating shift register, showing schematically the magnetic element 60 and the associated circuitry. Binary input signals are supplied by an input device 64 which is connected across the conductor 32 and which must supply current in the proper directions and to the propagating electrodes as discussed below. The input device may be a flip-flop or any other source of binary signals which provide suitable electric current. An output device 66 is connected between conductors 44 and 52 which form the output winding of the magnetic element. The output device may be a flip-flop or any other suitable device which can receive pulses signifying changes in state and convert these pulses to binary information.

The circuitry for supplying the proper energization of the propagating electrodes 36 and 38 will now be described. This circuitry must supply, at a first time, an electric current of a first direction to the electrode 38. At a second time, electric current of the first direction must be supplied to the electrode 36. At a third time, electric current of a second (opposite) direction must be supplied to the electrode 38. At a fourth time, electric current of the second direction must be supplied to the electrode 36.

One embodiment of circuitry which will supply the above-defined currents comprises a clock pulse generator 68 which supplies a series of electrical pulses. The clock pulse generator is connected to a first flip-flop 70 which is of the type having a single input 72 and two complementary outputs 74 and 76. As is well-known in the art, such a flip-flop will change state whenever it receives an input pulse. Thus, upon receiving a first pulse, the output 74 assumes a relatively high voltage, and the output 76 assumes a relatively low voltage. Upon receiving a second pulse, the outputs will be reversed; that is, the output 74 will assume a relatively low voltage, and the output 76 will assume a relatively high voltage. Upon receiving successive pulses, the states of the outputs 74 and 76 will correspondingly reverse.

The output 74 is connected to the input 78 of a second flip-flop 80, which has outputs 82 and 84. The flip-flop 80 which operates upon a decrease in voltage will change state, that is, the relative voltages of its outputs, whenever the output 74 of the flip-flop 70 changes is state from a relatively high voltage to a relatively low voltage. Such a change of state of the flip-flop 80 occurs upon every second clock pulse supplied to the flip-flop 70. Thus, if we consider that a first clock pulse sets both flip-flops 70 and 80 to a condition when the outputs 74 and 82 are both relatively low, the second clock pulse will set the flip-flop 70 to a condition in which the output 74 is relatively high and will not affect the flip-flop 80, leaving the output 82 in a low state. A third clock pulse will set the flip-flop 70 to a condition in which the output 74 is relatively low and will set the flip-flop 80 to a condition in which the output 82 is relatively high. A fourth clock pulse will set the flip-flop 70 to a condition in which the output 74 is relatively high and will not affect the flip-flop 80, leaving the output 82 in a high state. A fifth clock pulse will set both outputs 74 and 82 to a relatively low condition initiating another cycle.

The outputs 74 of flip-flop 70 and 82 of flip-flop 80 are connected to the intputs of a first conventional "and" gate 86. The outputs of 74 of flip-flop 70 and 84 of flip-flop 80 are connected to the inputs of a second "and" gate 88. The output 76 of the flip-flop 70 and the output 82 of the flip-flop 80 are connected to the inputs of a third "and" gate 90. The output 76 of the flip-flop 70 and the output 84 of the flip-flop 80 are connected to the inputs of a fourth "and" gate 92.

In FIG. 11, column I identifies the particular times constituting an operating cycle of the propagating electrodes 36 and 38. Column II shows the state of the flip-flop 70, a "zero" representing a relatively low voltage on the output 74 and a relatively high voltage on output 76, and a "one" representing a relatively high voltage on the output 74 and a relatively low voltage on the output 76. Column III shows the states of the flip-flop 80 with "zero" representing a state in which output 82 has a relatively low voltage and output 84 has a relatively high voltage, and "one" representing a state in which output 82 has a relatively high voltage and output 84 has a relatively low voltage. Since, in general, an "and" gate will provide a relatively high voltage at its output only when all of its inputs are supplied with a relatively high voltage, column IV shows which of the "and" gates will provide a relatively high voltage at its output for each of the four possible states of the flip-flop 70 and 80. It can be seen that only one "and" gate can possibly provide a relatively high voltage at a particular time and that the other "and" gates have a relatively low voltage on other outputs. Thus, at time 1, the "and" gate 92 has a relatively high voltage and is connected to one terminal of the propagating electrode 38. A return path is provided from the other terminal of the propagating electrode 38 to the "and" gate 90 which has a relatively low voltage at its output. At time 2, the "and" gate 88 is connected to one terminal of the propagating electrode 36 and supplies a relatively high voltage to its terminal. The return path is provided from the other terminal of the propagating electrode 36 to the "and" gate 86 which has a relatively low voltage at its output. At time 3, a relatively high voltage is supplied by the "and" gate 90 to one terminal of the propagating electrode 38 which has a return path from its opposite terminal to the "and" gate 92. At time 4, a relatively high voltage is supplied by the "and" gate 86 to the one terminal of the propagating electrode 36 which has a return path from its opposite terminal to the "and" gate 88. It can be seen that the directions of current produced by the voltages described provide proper actuation of the propagating electrodes.

The vacuum evaporation technique employed in constructing this novel magnetic element is conventional and well-known in the art. Suffice it to say for the purposes of this invention that the magnetic element may be built up by the sequential evaporation of each thin film layer by means of an individual mask having the configuration of the desired layer to be deposited. However, thin film devices may also be produced by other techniques than vacuum deposition. For example, the required configurations of conducting, insulating, and magnetic films may be produced by such processes or combinations of processes as electrodeposition, electrophoresis, silk screening techniques, or various inking, sketching, and printing techniques which allow thin planes of materials to be defined, registered, and applied upon a sub-surface.

It should be noted that the dimensions given hereinabove for the various thin film layers are not to be construed as limited thereto but are merely indicative of a preferable structure compatible with thin film considerations. The order of depositing the various conductive layers may also be varied from the order described.

It will now be appreciated that a novel and improved thin film magnetic element has been disclosed. This element may employ a pair of actuating electrodes, as shown, or it may be constructed with a pair of propagating electrodes on each side of the magnetic layer. In such a case, the electrodes would be associated in pairs; that is, the electrode 38 would have an associated electrode disposed in vertical alignment and in electrical continuity with the electrode 38. Similarly, the electrode 36 would have an associated electrode disposed in vertical alignment and in electrical continuity with the electrode 36. The use of a pair of electrodes should provide sharper and better defined magnetized zones.

While the operation of the device as a shift register has been shown in a four-beat cycle, it should be understood that other cycles containing different numbers of beats (electrode actuation patterns) may be used.

What is claimed is:

1. A magnetic device including a magnetic medium having an initial state of magnetization and adapted to shift the position of the boundary of a stable magnetized area having a magnetization antiparallel to said initial state of magnetization of said magnetic medium, said device comprising input means magnetically coupled to said magnetic medium for establishing said stable area of antiparallel magnetization in said medium, and means magnetically coupled to said magnetic medium for establishing a second antiparallel area in said medium at a distance less than the critical length of a stable magnetic domain from said boundary of said stable area.

2. A magnetic device for shifting the position of the boundary of a magnetized area and comprising a magnetic medium having an initial state of magnetization, an electrical conductor disposed adjacent said magnetic medium and adapted to have electrical signal currents flow therealong, for establishing a magnetic field to create a stable area of magnetization antiparallel to said initial state in said medium, a source of electrical signals electrically connected to said conductor, and means magnetically coupled to said magnetic medium for creating a second antiparallel area in said medium at a distance less than the critical length of a stable magnetic domain from the boundary of said stable area.

3. A magnetic device for shifting the position of different boundaries of a magnetized area and comprising a magnetic medium having an initial state of magnetization, an electrical conductor disposed adjacent said magnetic medium and adapted to have electrical signal currents flow therealong for producing a magnetic field linking said magnetic medium to create a stable area of magnetization antiparallel to said initial state in said magnetic medium, a source of electrical signals electrically connected to said conductor, and a pair of propagating electrodes magnetically coupled to said magnetic medium for creating sequentially further antiparallel areas in said medium, each having a distance less than the critical length of a stable magnetic domain from said different boundaries, respectively, of said stable area.

4. A magnetic device for shifting the position of different boundaries of a magnetized area comprising a magnetic medium having an initial state of magnetization, an electrical conductor disposed adjacent said magnetic medium and adapted to have electrical signal currents flow therealong for producing a magnetic field linking said magnetic medium to create a stable area of magnetization antiparallel to said initial state in said magnetic medium, a source of electrical signals electrically connected to said conductor, a first propagating electrode magnetically coupled to said magnetic medium for establishing a second antiparallel area in said medium at a distance less than the critical length of a stable magnetic domain from one boundary of said stable area, and a second propagating electrode magnetically coupled to said magnetic medium for establishing a third antiparallel area in said medium at a distance less than the critical length of a stable magnetic domain from another boundary of said stable area.

5. A magnetic device according to claim 4 in which said first and second propagating electrodes having widths less than said critical length and producing said second and third areas having lengths less than said critical length of stable magnetic domain.

6. A magnetic device comprising a magnetic medium having an initial state of magnetization, input means responsive to electrical signals and magnetically coupled to said magnetic medium for establishing in a first predetermined area thereof a stable state of magnetization different from said initial state of magnetization, output means responsive to the state of magnetization of said magnetic medium and magnetically coupled to said magnetic medium at a second predetermined area thereof spaced from said first predetermined area by a continuous portion of said magnetic medium, and means magnetically coupled to said magnetic medium for establishing an area of different magnetic state from said initial state of magnetization in said medium at a distance of less than the critical length of a stable magnetic domain from one boundary of said first predetermined area.

7. A magnetic device comprising a magnetic medium having an initial state of magnetization, input means responsive to electrical signals and magnetically coupled to said magnetic medium for establishing in a first predetermined area thereof a stable state of magnetization different from said initial state of magnetization, output means responsive to the state of magnetization of said magnetic medium and magnetically coupled to said magnetic medium, said output means being spaced from said first predetermined area by a continuous portion of said magnetic medium, and means magnetically coupled to said magnetic medium for establishing a second area of different magnetic state from said initial state of magnetization in said magnetic medium and having a length less than the critical length of a stable magnetic domain in said medium and being at a distance less than the critical length of a stable magnetic domain from the boundary of said first predetermined area.

8. A magnetic device comprising a magnetic medium having an initial state of magnetization, a source of electrical signals, an electrical conductor electrically connected to said source of electrical signals and magnetically coupled to said magnetic medium for establishing in a first predetermined area thereof a different stable state of magnetization from said initial state of magnetization, output means responsive to the state of magnetization of said magnetic medium and magnetically coupled to said magnetic medium, said output means being spaced from said first predetermined area by a continuous portion of said magnetic medium, and means including a pair of propagating electrodes magnetically coupled to said magnetic medium for establishing area of different magnetic state from said initial state of magnetization in said medium, each of said last named areas having a length less than the critical length of a stable magnetic domain and being at a distance less than the critical length of a stable magnetic domain from respective boundaries of a then existing area of said different stable state of magnetization.

9. A device according to claim 8 in which said medium is flat and of elongated shape, and in which each of said propagating electrodes comprises a plurality of conducting elements disposed transverse to the elongated direction of and parallel to the plane of said medium, said conducting portions being electrically interconnected in each of said propagating electrodes so that electric current flows in opposite directions in adjacent conducting portions of each propagating electrode.

10. A device according to claim 8 in which said medium is flat and of elongated shape, and in which each of said propagating electrodes includes a plurality of electrically interconnected transverse conducting portions disposed transverse to the elongated direction of and parallel to the plane of said magnetic medium and in which the width of each of said conducting portions is less than the critical length of a stable magnetic domain.

11. A device according to claim 8 in which said transverse conducting portions of one propagating electrode are displaced lengthwise of said magnetic medium from the transverse conducting portions of the other propagating electrode by an amount less than the critical length of a stable magnetic domain.

12. A thin film magnetic device comprising a magnetic medium having an initial state of magnetization, said medium being flat and of elongated shape, a source of electrical signals, an electrical conductor electrically connected to said source of electrical signals and magnetically coupled to said magnetic medium for establishing in a first predetermined area thereof a different stable state of magnetization from said initial state of magnetization, an output winding spaced from said first predetermined area by a continuous portion of said medium and disposed transverse to the elongated direction of and parallel to the plane of said medium, said output winding being magnetically coupled to said medium, and responsive to the state of magnetization of said medium, a source of control signals, and a pair of propagating electrodes responsive to said control signals for establishing areas of different magnetic state from said initial state of magnetization in said medium, each of said last named areas having a length less than the critical length of a stable magnetic domain and at least one being at a distance less than the critical length of a stable magnetic domain from the boundary of a then existing area of said different stable state of magnetization, each of said propagating electrodes comprising a plurality of conducting portions having a width less than the critical length of a stable magnetic domain and disposed transverse to the elongated direction of and parallel to the plane of said magnetic medium, said conducting portions being electrically interconnected in each of said propagating electrodes so that electric current flows in opposite directions in adjacent conducting portions of each propagating electrode, said conducting portions of said propagating electrodes respectively, being displaced from each other by an amount less than the critical length of a stable magnetic domain.

References Cited in the file of this patent

UNITED STATES PATENTS 2,919,432 Broadbent ---------------- Dec. 29, 1959